US008819646B2

(12) United States Patent
Baudisson et al.

(10) Patent No.: US 8,819,646 B2
(45) Date of Patent: Aug. 26, 2014

(54) CONTROL ARCHITECTURE AND PROCESS FOR PORTING APPLICATION SOFTWARE FOR EQUIPMENT ON BOARD AN AIRCRAFT TO A CONSUMER STANDARD COMPUTER HARDWARE UNIT

(75) Inventors: Jean-Luc Baudisson, Bras (FR); Jean-Pierre Lebailly, Gignac-la-Nerthe (FR)

(73) Assignee: Airbus Helicopters, Marignane Cedex (FR)

( * ) Notice: Subject to any disclaimer, the term of this patent is extended or adjusted under 35 U.S.C. 154(b) by 634 days.

(21) Appl. No.: 13/074,546

(22) Filed: Mar. 29, 2011

(65) Prior Publication Data

US 2011/0246975 A1  Oct. 6, 2011

(30) Foreign Application Priority Data

Mar. 30, 2010  (FR) ...................... 10 01281

(51) Int. Cl.
*G06F 9/44* (2006.01)
*G06F 11/00* (2006.01)
*G06F 9/455* (2006.01)

(52) U.S. Cl.
USPC .......... 717/134; 717/135; 717/168; 714/38.1; 718/1; 703/27

(58) Field of Classification Search
None
See application file for complete search history.

(56) References Cited

U.S. PATENT DOCUMENTS

| 5,541,863 | A | * | 7/1996 | Magor et al. ................ 702/122 |
| 5,551,015 | A | | 8/1996 | Goettelmann et al. | |
| 6,654,950 | B1 | | 11/2003 | Barnishan | |
| 6,976,174 | B2 | * | 12/2005 | Terrell et al. .................... 726/22 |
| 7,406,050 | B2 | * | 7/2008 | Calluaud et al. .............. 370/250 |
| 2002/0124108 | A1 | * | 9/2002 | Terrell et al. ................... 709/245 |
| 2009/0083734 | A1 | * | 3/2009 | Hotra ............................. 718/1 |
| 2010/0218172 | A1 | | 8/2010 | Randimbivololona | |
| 2011/0047529 | A1 | | 2/2011 | Randimbivololona | |

FOREIGN PATENT DOCUMENTS

FR  2916546 A1  11/2008
FR  2921170 A1  3/2009

OTHER PUBLICATIONS

Belanger, N., et al., "An Open Real Time Test System Approach," First International Conference on Advances in System Testing and Validation Lifecycle [online], 2009 [retrieved Sep. 9, 2013], Retrieved from Internet: http://ieeexplore.ieee.org/stamp/stamp.jsp?tp=&arnumber=5279987>.*

(Continued)

*Primary Examiner* — Don Wong
*Assistant Examiner* — Todd Aguilera
(74) *Attorney, Agent, or Firm* — Brooks Kushman P.C.

(57) ABSTRACT

A software unit arrangement method includes developing a standardized software-hardware abstraction software layer in a software unit. The standardized abstraction software layer includes a library of primitives that interface with the source codes of the software unit and with a real or virtual computer hardware unit. The method includes developing a real-hardware or virtual-hardware software layer in the associated computer hardware unit. The real-hardware or virtual-hardware software layer forming the portion of the computer hardware unit that interfaces with the standardized abstraction software layer and that presents real and/or virtual input/output cards performing at least the same functions as the real standard input/output cards of the real computer hardware unit.

12 Claims, 3 Drawing Sheets

(56) References Cited

OTHER PUBLICATIONS

Lebailly, J-P., et al. "Promoting Avionic Tests System as Productivity Enablers: The EASI Case Study," 2010 Fifth International Conference on Systems [online], 2010 [retrieved Apr. 14, 2014], Retrieved from Internet: <URL: http://ieeexplore.ieee.org/xpls/abs_all.jsp?arnumber=5464171>, pp. 66-70.*

Black R et al: "Next generation space avionics: a highly reliable layered system implementation" Digital Avionics Systems Conference, 2004, DASC 04. The 23rd Salt Lake City, UT, USA Oct. 24-28, 2004, Piscataway, NJ, USA, IEEE, US, Oct. 24, 2004. pp. 13.E.4-131 ISBN: 978-0-7803-8539-9.

R. Black: "Using Proven Aircraft Avionics Principles to Support a Responsive Space Infrastructure" 4th Responssive Space Conference, Apr. 24, 2006, pp. 1-6 Extrait de l'Internet: URL: http://www.responsivespace.com/Papers/RS4%5CPapers%5CRS4_1006P_BLACK.PDF.

Search Report for the corresponding foreign priority Application No. FR 1001281; Dated; Mar. 16, 2011.

\* cited by examiner

CONTROL ARCHITECTURE AND PROCESS FOR PORTING APPLICATION SOFTWARE FOR EQUIPMENT ON BOARD AN AIRCRAFT TO A CONSUMER STANDARD COMPUTER HARDWARE UNIT

CROSS REFERENCE TO RELATED APPLICATIONS

This application claims the benefit of FR 10/01281 filed on Mar. 30, 2010, the disclosure of which is incorporated in its entirety by reference herein.

BACKGROUND OF THE INVENTION (1) Technical Field

The present invention relates to a method of arranging at least one piece of application software for operating on a computer hardware unit of equipment so that it operates like a piece of equipment that is at least partially virtual on standard computer hardware, and it also relates to a communications control architecture for standard computer hardware including such software.

(2) Description of Related Art

More particularly, the present invention relates to arranging a piece of on-board application software on host computer hardware that may be the hardware of the equipment for which the software is intended, in which case the hardware is said to be "real" and the arrangement then takes the form of hosting. The present invention also relates to arranging the application software on host computer equipment of consumer standard, suitable for example for being coupled to a simulation tool, the other equipment then being said to be "broadly" virtual when it includes real standard input/output cards, and/or being said to be virtual or "strictly" virtual when it includes only virtual input/output cards having at least the same functions as real input/output cards, with the arrangement then taking the form of re-hosting or "porting".

Throughout the text below, equipment or hardware that is "broadly" virtual or "strictly" virtual is referred to generically as being "at least partially" virtual.

The present invention with its associated computer hardware then forms a communications control architecture respectively for the real equipment or for the at least partially virtual equipment. This arrangement may be used for various steps in the lifetime cycle of the software by providing a model that is representative of the behavior of the equipment, in particular it may be used for proceeding with preliminary testing prior to installing the software on the equipment for which it is intended or for testing after the software has been installed on said equipment, e.g. as a result of updating said software, with this being done in a real or a simulated environment for the software or indeed when it is incorporated in application software for providing an environment simulator.

Below, an example software application used is that of operating equipment on board a vehicle, and in particular an aircraft. It should be understood that this is done purely by way of illustration and does not present any limiting character on the software that forms a portion of the communications control architecture of the present invention.

In this example, the composition of a communications control architecture A for a piece of equipment that is to be mounted on board a vehicle, and advantageously on board an aircraft, the architecture A being made in accordance with the prior art. This architecture A is made up of a software unit 1a and a computer hardware unit. The software unit comprises various pieces of software, and in particular application software, digital bus controller software, and software for converting physical magnitudes into raw data in the format(s) of digital buses and/or of inputs/outputs of analog and/or discrete type.

The software unit comprises an original equipment manufacturer's (OEM) software-hardware abstraction software layer corresponding to the computer hardware unit of the equipment in which the software unit is to be arranged. This layer is a software utility that controls the peripherals of the computer hardware unit to provide communication between the software unit and the computer hardware unit.

The OEM software-hardware abstraction software layer enables the pieces of various software of the software unit to operate with the computer hardware of the equipment for which the software is mainly intended. Said computer hardware unit presents a series of input/output cards with a digital bus and/or inputs/outputs of analog and/or discrete type for implementing the equipment by communicating outside the control architecture, together with corresponding drivers. Communication between the software unit and the computer hardware unit takes place in both directions as represented by arrows. The computer hardware unit communicates outside the control architecture in input as represented by arrow and in output as represented by other arrow.

During the development lifetime cycle of the software, it is common practice to arrange a piece of application software by re-hosting it on computer hardware units other than the hardware unit of the equipment for which it is intended, the software unit and the re-hosting computer hardware then forming another control architecture referred to as a "virtual" architecture, as contrasted with a "real" architecture when the software unit is associated with the hardware unit of its destination equipment. Thus, the software unit can be arranged on a computer hardware unit other than the hardware unit of its equipment, e.g. the hardware of a simulation tool acting as equipment that is, at least partially, virtual. This makes it possible to perform simulations that are representative of the operation of the equipment as reproduced by the simulation tool. For reasons of cost, it is often advantageous for the simulation tool receiving the at least partially virtual equipment to be made up of electronic elements of a standard that is widespread and inexpensive. Thus, it is very important for this arrangement in the form of re-hosting to take place quickly, without difficulty, and to be performed reliably while advantageously being inexpensive.

Document U.S. Pat. No. 5,551,015 describes a method and a device for directly converting a program in an object code that runs on dedicated equipment to run in various other pieces of equipment having their own architectures. For those other pieces of equipment, the purpose is to simulate fully the operation of the main destination equipment, so as to run the program in object form, i.e. without recompiling it.

Document U.S. Pat. No. 6,654,950 describes a software arrangement system. In that document, the idea is to convert code in a first language into some other base language that may be the language of the simulation tool.

The methods and the systems described in those documents involve testing times that are lengthy because of the cycles of modification, unitary testing on the development platform, generating the on-board code, loading it into the target computer, and testing on an integration bench may be very lengthy. That increases development costs when integrating software in target equipment, giving rise in particular to the test bench being monopolized for long periods, to expensive monopolization of real pieces of equipment, to a high cost of platform simulators, in particular for document U.S. Pat. No. 5,551,015, to unavailability of the real pieces of equipment, and to difficulty in obtaining pieces of equipment in their reference software versions, with the same applying to training simulators.

The simulation of a piece of equipment involving both equipment control functions and a bus controller function cannot be performed using a communications layer that does no more than exchange data in shared memory.

SUMMARY OF THE INVENTION

The problem of the present invention is to enable application software to be arranged equally well on the computer hardware of the equipment for which it is intended and on another piece of equipment, said arrangement being performed in a manner that is simple and effective while guaranteeing safe and reliable communication between said software and the computer hardware of the corresponding equipment.

To this end, the invention provides an arrangement method for arranging a software unit intended for a piece of equipment equally well either on a computer hardware unit of said equipment, the equipment and its computer hardware then being said to be "real", or else on a computer hardware unit of other equipment, the other equipment and its computer hardware then being said to be "at least partially virtual", said at least partially virtual computer hardware being "strictly" virtual when it manages virtual input/output cards, and being "broadly" virtual when it manages either real input/output cards, or an association of real and virtual input/output cards, wherein the arrangement method comprises the following steps:

a step of developing a standardized software-hardware abstraction software layer in the software unit, the standardized software-hardware abstraction software layer being made up of a library of primitives that interface firstly with the source codes of the software unit and secondly with the real or at least partially virtual computer hardware unit; and a step of developing one real-hardware software layer for each real computer hardware unit or one virtual-hardware software layer for each at least partially virtual computer hardware unit, each real-hardware or virtual-hardware software layer of a hardware unit being suitable for communicating with the standardized software-hardware abstraction software layer, each real-hardware software layer co-operating with real input/output cards and each virtual-hardware software layer co-operating with real and/or virtual input/output cards.

According to additional embodiments of the present invention:

the method consists in hosting the software unit on the real hardware unit of the real hardware or in re-hosting the software unit on the at least partially virtual hardware unit;

the method includes a step of developing a communications software layer implementing and managing data exchanges between said virtual input/output cards, when present, said cards possibly forming portions of an at least partially virtual piece of equipment or of a group of at least partially virtual pieces of equipment of a test or simulation tool;

the method includes connecting disturbance software to the virtual-hardware software layer to deliver indications of physical disturbances likely to be encountered on the real transmission media and to be conveyed by the communications software layer;

the method includes a step of testing the virtual-hardware software layer that includes the drivers for real and/or virtual input/output cards and for testing the communications software layer by coupling the software unit running on an at least partially virtual computer hardware unit coupled to at least one simulation tool acting as at least partially virtual equipment;

the standardized software-hardware abstraction software layer presents a common software structure so as to be capable of being associated equally well with a plurality of real or at least partially virtual computer hardware units;

the development of the standardized software-hardware abstraction software layer in the software unit comprises: a step of recovering source codes of the application software of the software unit to be arranged; a step of adapting the source codes of said application software to a compiler of the real or at least partially virtual computer hardware unit; and a step of compiling and editing links for said software unit and said standardized software-hardware abstraction software layer;

the method includes a step of testing the software unit of the equipment on an a standard at least partially virtual computer hardware unit that is coupled at least to a test tool acting as at least partially virtual equipment;

the method includes integrating or directly coupling a plurality of real input/output cards and/or a plurality of virtual input/output cards with the hardware abstraction software layer via the real-hardware software layer or the virtual-hardware software layer; and communication between the software unit and the real or at least partially virtual computer hardware unit takes place using a standardized communications protocol.

The invention also provides a real or virtual control architecture having a software unit and a computer hardware unit that is either real or at least partially virtual, said real or virtual architecture being allocated to operating a piece of equipment for which it is intended that is said to be respectively real equipment or equipment other than said real equipment, the equipment other than said real equipment being equipment that is at least partially virtual, said real or at least partially virtual computer hardware unit receiving said software unit and being specific to the real or virtual equipment by managing said equipment via real input/output cards communicating with digital buses to operate the real equipment, or with real and/or virtual input/output cards for communicating with at least partially virtual equipment, the architecture comprising:

a standardized software-hardware abstraction software layer made up of a library or primitives that interface firstly with source codes of the software unit and secondly with the real or at least partially virtual computer hardware unit; and a real-hardware software layer or a virtual-hardware software layer respectively in the real computer hardware unit or the at least partially virtual computer hardware unit, said real-hardware or virtual hardware software layer forming the portion of the real or at least partially virtual computer hardware unit that interfaces with the standardized software-hardware abstraction software layer, the real-hardware software layer serving respectively to manage real input/output cards communicating with digital buses of the real computer hardware unit of the real equipment, the virtual-hardware software layer serving to manage real and/or virtual input/output cards communicating with digital buses of analog type and/or of discrete type of the at least partially virtual computer hardware unit, said virtual cards performing at least the same functions as the real input/output cards and their associated drivers of the real computer hardware unit.

In embodiments, for a virtual architecture for use with at least one simulation tool acting as at least partially virtual equipment, its at least partially virtual computer hardware unit is of a standard that is widespread and inexpensive, of the unitary PC type or comprising at least two PCs connected together, the virtual input/output cards with their drivers, when present, being incorporated in or coupled to the virtual-hardware software layer, the virtual input/output cards being managed via an inexpensive and widespread standard network of the Ethernet type or of the type comprising a network of analog and discrete signals.

In embodiments, the virtual architecture includes only real input/output cards.

In embodiments, the virtual architecture includes only virtual input/output cards, a communications software layer implementing and managing data exchanges between the virtual input/output cards.

In embodiments, the virtual architecture includes a combination of real input/output cards and of virtual input/output cards, a communications software layer implementing and managing data exchanges between the virtual input/outputs.

The invention also provides real or at least partially virtual equipment, wherein it respectively includes such a real or virtual architecture.

The invention also provides a group made up of such real or at least partially virtual pieces of equipment, wherein the real or at least partially virtual pieces of equipment present, in their software units, standardized software-hardware abstraction software layers of similar design.

In embodiments, at least a portion of the real or at least partially virtual computer hardware units are connected to one another, said portion forming real or partially virtual equipment combining the functions of the real or at least partially virtual pieces of equipment making it up.

Finally, the invention provides a vehicle, including on board such a real piece of equipment or such a group of real pieces of equipment. In embodiments, the vehicle is an aircraft.

The technical effect is obtained essentially by replacing the already-known OEM software-hardware abstraction software layer in the communications control architecture of the equipment with a standardized software-hardware abstraction software layer. This layer can co-operate equally well either with a real-hardware software layer, when the associated computer hardware unit is the unit corresponding to the communications control architecture of the equipment, or with a virtual-hardware software layer when the computer hardware unit is the unit corresponding to the communications control architecture of a tool for simulating said equipment. The standardized abstraction software layer and the real-hardware abstraction software layer or the virtual-hardware abstraction software layer are interposed between the software unit and the computer hardware unit of said equipment.

Furthermore, in some embodiments it is advantageous adding a communications software layer that makes it possible to simulate the software unit at a development stage that is as early as possible and as inexpensive as possible.

While complying with the original design of the software unit, the technical effect obtained is that of greatly facilitating the arrangement of the software unit on the real hardware unit of the on-board equipment for normal operation thereof or on an at least partially virtual computer hardware unit of a simulation tool in order to perform simulation trials of said equipment.

BRIEF DESCRIPTION OF THE DRAWINGS

The invention is described below in greater detail but in non-limiting manner with reference to the accompanying figures, in which.

DETAILED DESCRIPTION OF THE PREFERRED EMBODIMENTS

Figure 1:
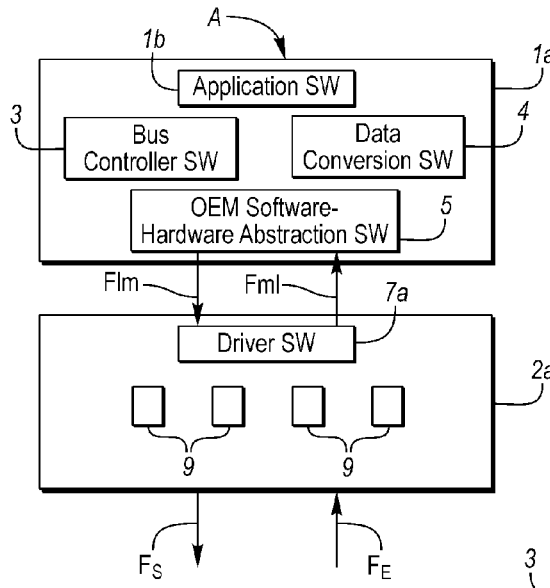
FIG. 1 is a diagram of communications control architecture of equipment with its computer hardware and software units of the prior art.

FIG. 1 is similar to the first prior art example exposed in the introductory portion of the description of the present application.

FIG. 1 shows the composition of a communications control architecture A for a piece of equipment that is to be mounted on board a vehicle, and advantageously on board an aircraft, the architecture A being made in accordance with the prior art. This architecture A is made up of a software unit 1a and a computer hardware unit 2a. The software unit 1a comprises various pieces of software, and in particular application software 1b, digital bus controller software 3, and software 4 for converting physical magnitudes into raw data in the format(s) of digital buses and/or of inputs/outputs of analog and/or discrete type.

The software unit 1a comprises an original equipment manufacturer's (OEM) software-hardware abstraction software layer 5 corresponding to the computer hardware unit 2a of the equipment in which the software unit 1a is to be arranged. This layer 5 is a software utility that controls the peripherals of the computer hardware unit 2a to provide communication between the software unit 1a and the computer hardware unit 2a.

The OEM software-hardware abstraction software layer 5 enables the pieces of software 1b, 3, and 4 of the software unit 1a to operate with the computer hardware 2a of the equipment for which the software 1a is mainly intended. Said computer hardware unit 2a presents a series of input/output cards 9 with a digital bus and/or inputs/outputs of analog and/or discrete type for implementing the equipment by communicating outside the control architecture A, together with corresponding drivers 7a. Communication between the software unit 1a and the computer hardware unit 2a takes place in both directions as represented by arrows Flm and Fml. The computer hardware unit 2a communicates outside the control architecture A in input as represented by arrow $F_E$ and in output as represented by arrow $F_S$.

During the development lifetime cycle of the software, it is common practice to arrange a piece of application software by re-hosting it on computer hardware units other than the hardware unit of the equipment for which it is intended, the software unit and the re-hosting computer hardware then forming another control architecture referred to as a "virtual" architecture, as contrasted with a "real" architecture when the software unit is associated with the hardware unit of its destination equipment. Thus, the software unit 1a can be arranged on a computer hardware unit 2a other than the hardware unit of its equipment, e.g. the hardware of a simulation tool acting as equipment that is at least partially virtual. This makes it possible to perform simulations that are representative of the operation of the equipment as reproduced by the simulation tool. For reasons of cost, it is often advantageous for the simulation tool receiving the at least partially virtual equipment to be made up of electronic elements of a standard that is widespread and inexpensive. Thus, it is very important for this arrangement in the form of re-hosting to take place quickly, without difficulty, and to be performed reliably while advantageously being inexpensive.

Figure 2:
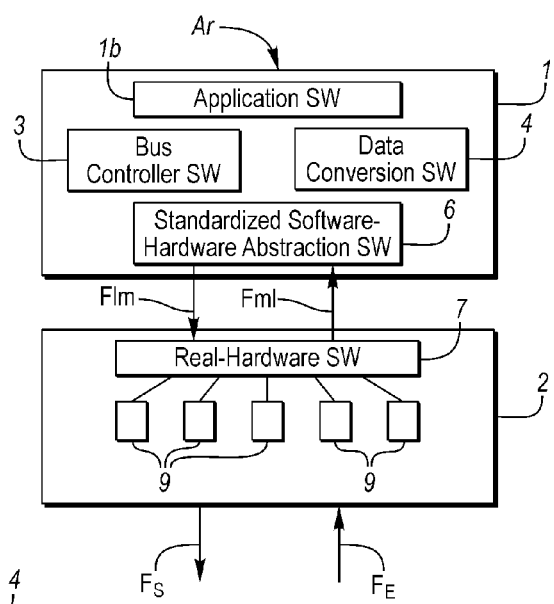
FIG. 2 is a diagram of so-called "real" communications control architecture of equipment with its computer hardware and software units of the present invention.

FIG. 2 shows the composition of a so-called "real" control architecture Ar made in accordance with the present invention for a piece of equipment for which the software is mainly dedicated, the equipment being for mounting on board a vehicle, advantageously an aircraft. This main intended equipment is referred to below as being "real". In this figure, in the software unit 1, the application software 1b, the digital bus controller software 3, and the software 4 for converting physical magnitudes into raw data remain unchanged compared with FIG. 1. Below, the computer hardware unit 2 specific to a real architecture Ar is referred to as the real computer hardware unit 2.

The OEM software-hardware abstraction software layer 5 of FIG. 1 is replaced by a standardized software-hardware abstraction software layer 6 presenting a software-hardware interface that may be similar for all of the control architectures presenting different computer hardware units that might be called on to work with the software unit 1 when the software unit 1 is arranged on those architectures. For example, the computer hardware unit may be for controlling the real equipment or at least one other piece of equipment, referred to below as at least partially virtual equipment, and described in greater detail with reference to FIGS. 3, 3a, and 3b.

The standardized software-hardware abstraction software layer 6 depends on the manufacturer and relays the services expected by the application software 1b to the operating system of the real computer hardware unit 2. This is performed by interfacing the standardized software-hardware abstraction hardware layer 6 with a communications software layer of the real computer hardware unit 2, referred to below as the real-hardware software layer and given reference 7 in FIG. 2.

The standardized software-hardware abstraction software layer 6 may differ depending on the OEM, but it offers a common interface for all on-board applications that have either been developed by the manufacturer of the vehicle or else been provided by the OEMs of said manufacturer, which common interface is suitable for at least the various different versions of the same equipment, these versions comprising different variants of the real equipment or of the tools for simulating said equipment as virtual equipment. The standardized software-hardware abstraction software layer 6 is thus compatible with the different versions of given equipment, which versions may be real or virtual.

In a variant, it is advantageous to standardize the standardized software-hardware abstraction software layer 6 for all OEMs of equipment for mounting on board a given vehicle or similar vehicles, so as to facilitate the arrangement of the software unit in a given control architecture in order to minimize the portion of the software that needs to be adapted in said standardized software-hardware abstraction software layer 6 during said arrangement.

The real-hardware software layer 7 located beside the real hardware unit 2 provides the standardized software-hardware abstraction layer 6 with services enabling it to cause information to travel over the digital buses and/or the inputs/outputs of analog and/or discrete type via so-called "real" input/output cards 9 included in the real computer hardware unit 2 of the real architecture Ar in which the software unit 1 is arranged, with such arrangement then amounting to hosting.

With reference to real equipment mounted on board an aircraft, there exist several types of digital communications buses that are specialized for aviation and that represent elements of sophisticated standard and relatively high cost, e.g. Mil-STD-1553, Arinc 429 and Arinc 653, RS485 or EIA-485, etc. . . . . Similarly, there exist a large number of signals traveling in analog format (voltage, current, frequency), or in discrete format, etc. The drivers of the real input/output cards 9, constitute the real-hardware software layer 7, being incorporated in or coupled to said software layer 7. Thus, said layer 7, in addition to interfacing with the standardized software-hardware abstraction software layer 6 serves to manage the input/output cards 9, which cards, in the prior art, were implemented directly by the computer hardware unit 2a shown in FIG. 2.

Figure 3:
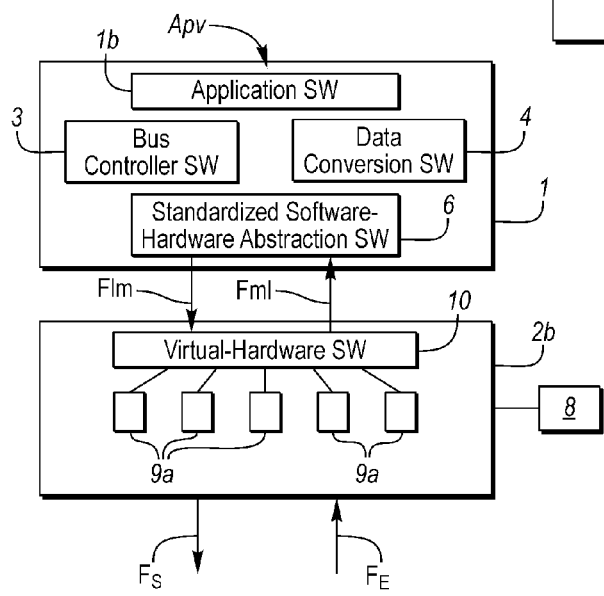
FIG. 3 is a diagram of virtual communications control architecture of broadly virtual equipment, in particular in the form of a simulation tool, with its computer hardware and software units of the present invention.
Figure 3A:
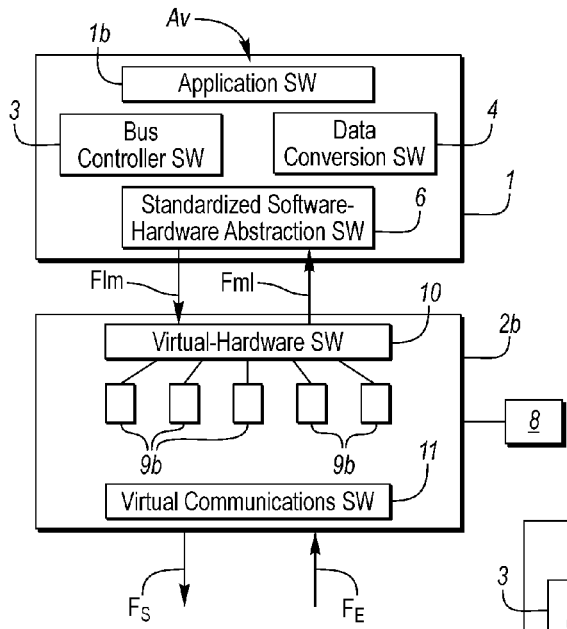
FIG. 3a is a diagram of virtual communications control architecture of strictly virtual equipment, in particular in the form of a simulation tool, with its computer hardware and simulation units of the present invention.
Figure 3B:
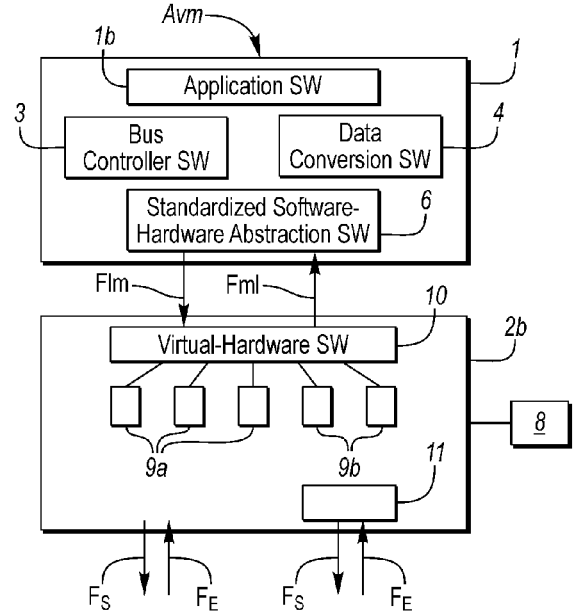
FIG. 3b is a diagram of mixed virtual communications control architecture of so-called "broadly" virtual equipment, in particular in the form of a simulation tool, with its computer hardware and software units of the present invention.

FIGS. 3, 3a, and 3b show respective control architectures for the communications of a piece of equipment other than the real equipment for which the architecture is designed, said other equipment being referred to as equipment that is at least partially virtual, as mentioned above.

FIG. 3 shows a communications control architecture Apv of partially virtual equipment with a virtual-hardware software layer 10 comprising only real input/output cards 9a with their associated drivers, with this being for a computer hardware unit 2b that is at least partially virtual, said equipment being referred to as "broadly" virtual.

It should be observed that the real input/output cards 9a of such at least partially virtual equipment may be substantially different from the real input/output cards 9 shown in FIG. 2 for real equipment. These cards 9a may present functions other than the function of controlling the equipment. For example, these real cards 9a may include disturbance software, software that is described below, and that is represented under reference 8 in FIGS. 3, 3a, and 3b, as being not incorporated in the real cards 9a when they are present.

FIG. 3a shows a communications control architecture Av of equipment that is entirely virtual, said equipment then being referred to as "strictly" virtual. The architecture Av has a virtual-hardware software layer 10 including the drivers of the virtual input/output cards 9b, for a virtual computer hardware unit 2b.

FIG. 3b shows a communications control architecture Avm of partially virtual equipment, this equipment being referred to as "broadly" virtual. This architecture Avm has a virtual-hardware software layer 10 including the drivers of the real and virtual input/output cards 9a and 9b, for a computer hardware unit 2b that is at least partially virtual.

With reference to FIGS. 3 and 3b, the real input/output cards 9a of such at least partially virtual equipment shown in these figures may be substantially different from the real 1 input/output cards 9 shown in FIG. 2. For example, and without this being limiting, these real input/output cards 9a may include functions other than those of the cards that are designed solely for controlling equipment, in particular by incorporating disturbance software, this software being shown in FIGS. 3 and 3*b* under the reference 8 as not being incorporated within the real input/output cards 9*a*. Such real input/output cards for at least partially virtual equipment are generally referred to as "standard" cards.

For the communications control architectures Av and Avm shown respectively in FIGS. 3*a* and 3*b*, a communications software layer 11 is provided in the computer hardware unit 2*b* to implement and manage data exchanges between the virtual input/output cards 9*b*, said cards 9*b* possibly forming part of virtual equipment or of a virtual group of pieces of equipment of a test or simulation tool.

In all of FIGS. 3, 3*a*, and 3*b*, the architecture corresponding to the at least partially virtual equipment is said to be a "virtual" architecture Apv, Av, or Avm, as contrasted with the real architecture Ar for controlling real equipment. This virtual architecture Apv, Av, or Avm comprises a software unit 1 and a computer hardware unit other than that for which the software unit 1 is intended, and referred to below by extension as a computer hardware unit 2*b* that is at least partially virtual.

The arrangement taking the form of re-hosting the software unit 1 in an at least partially virtual computer hardware unit 2*b* of a virtual architecture is implemented to undertake simulation testing on the software, the testing taking place during certain steps of the procedure for designing and developing a software unit, as described below with reference to FIG. 4, with the at least partially virtual equipment as obtained in this way then executing under the control of a simulation tool.

Unlike hosting where the software unit is arranged in the hardware unit of the real control architecture for the real equipment shown in FIG. 2, this real hardware unit being specialized to match said real equipment and of relatively high cost, re-hosting by arranging the software unit in such a virtual communications control architecture of equipment that is at least partially virtual, e.g. a simulation tool, can be performed on a computer hardware unit 2*b* that is at least partially virtual and of a widespread standard, i.e. made up of components that are easily available commercially and commonly referred to as "commercial off-the-shelf" (COTS), e.g. a personal computer (PC) that may be in the form of a laptop or of at least two PCs connected together, said PC(s) being fitted with real and/or virtual input/output cards for a communications control architecture of equipment that is at least partially virtual. This makes it possible to test and develop the source code on apparatus in the same manner as would be performed by an emulator during an integration stage on a target carrier or on a flight simulator, i.e. without needing specifically to simulate the environment.

For the architectures Apv and Avm of partially virtual equipment as shown respectively in FIGS. 3 and 3*b*, these architectures include standard real input/output cards 9*a* together with their drivers incorporated in the virtual-hardware software layer 10 in a manner similar to the communications control architecture of real equipment as shown in FIG. 2.

This makes it possible to test and develop source code on apparatus in the same manner as would be performed on an emulator during an integration stage or on a target carrier, and thus without stimulating the environment.

With reference to FIGS. 3*a* and 3*b*, within the communications software layer 11, data exchanges may take place via a software element that forms a socket, said element constituting a software interface with the operating system of the at least partially virtual computer hardware unit 2*b*, said interface making it easier to operate a network protocol service.

Such data exchanges may also be performed using a data distribution service (DDS). This makes it possible to run the various arranged software units by recompiling and editing links with the library of the standardized software-hardware layer 6 on a single PC or on a group of PCs connected together.

A virtual architecture Av of strictly virtual equipment as shown in FIG. 3*a* also makes it possible to perform non-regression tests at a speed that depends on the power of the host PC, to simulate breakdowns on the virtual network, e.g. non-responsive, Manchester errors, parity errors, etc. . . . , and to evaluate bus loadings, and to combine simulated and real environments.

For a virtual architecture Apv, Av, or Avm, as shown respectively in FIGS. 3, 3*a*, and 3*b*, the real-hardware software layer 7 is replaced by a virtual hardware software layer 10 associated with standard real cards 9*a* as shown in FIG. 3 or with virtual input/output cards 9*b* optionally combined with standard real cards as shown in FIGS. 3*a* and 3*b*, these cards then presenting their drivers incorporated in said layer 10.

As shown in FIGS. 3*a* and 3*b*, provision may be made for a communications software layer of the at least partially virtual computer hardware unit 2*b* of said virtual architecture Av or Avm, said layer being referred to below as the virtual communications software layer 11 and co-operating with the virtual input/output cards 9*b*.

For a strictly virtual architecture of said layer 10, as shown in FIG. 3*a*, said architecture Av associated with virtual cards 9*b* provides at least the same services as the real-hardware software layer 7 and the real input/output cards, but via virtual input/output cards 9*b* that replace the real cards referenced 9 in FIG. 2, said virtual cards 9*b* being coupled with or incorporated in said layer 10.

The virtual-hardware software layer 10 is modulateable. It may simulate all or some of the following buses: Arinc 429 or 653; Mil STD 1553B; RS232/422/485 in virtual form. In FIG. 3*a*, the software communications layer 11 may comprise an Ethernet network or a network of analog or discrete signals, i.e. communications means of relatively low cost. As a result, the data exchanges of the virtual architecture Av, instead of taking place over an expensive digital bus, take place over a conventional network, e.g. an Ethernet network, without additional equipment being added. It is also possible to group together real or virtual architectures in order to form an architecture group controlling a test tool, as described below with reference to FIG. 5.

With reference to FIGS. 2, 3, 3*a*, and 3*b*, in order to arrange a software unit 1 in the real or virtual computer hardware unit 2 or 2*b* specific to the real or virtual architecture Ar or Av, Avm, or Apv, it suffices to adapt the software unit 1 to said real computer hardware unit 2 or to said at least partially virtual hardware unit 2*b*, and in particular to its operating system, e.g. running under LINUX, and also to its compilers. This repetitive action may be automated, or alternatively the source code of the software unit 1 may be adapted to make this arrangement easier. Thereafter, it suffices to establish coupling between the standardized software-hardware abstraction software unit 6 and either the real-hardware software layer 7 or the virtual-hardware software layer 10.

The interfaces of the real-hardware software layers 7 and the virtual-hardware software layers 10 are strictly identical concerning their software portions or any other programs that might be connected thereto. Thus, to use a model arranged in real or virtual mode, it suffices to couple it dynamically to the appropriate library of the software unit 1. This does not require any manipulation on the code of the model.

With reference to FIGS. 3, 3a, and 3b, and as mentioned above, the virtual-hardware software layer 10 may be connected to disturbance software 8 that may be external to the at least partially virtual hardware unit 2b and that may additionally execute the disturbance services proposed by said software 8.

The virtual-hardware software layer 10 makes it possible to test the software with real digital buses even before the real equipment is available, and makes it possible to test the application software in the same environment as the real equipment, which means that the tests may be defined in similar manner. The operating system of the standard computer hardware unit 2b of a virtual architecture preferably operates under the LINUX OS, however it is also possible to use some other operating system.

The virtual-hardware software layer 10 also makes it possible to use the same interface, i.e. the same simulation tool as at least partially virtual equipment in order to test systems that are arranged completely in the form of re-hosting and to use the same cards for all of the tools operating under the same operating system, e.g. LINUX and UNIX (U-TEST®).

Figure 4:
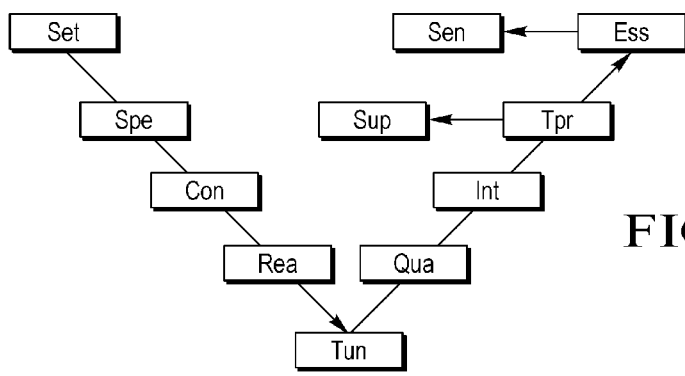
FIG. 4 is a plan of a general method for designing and developing software for equipment that is to be mounted on board a vehicle, the steps of the method being shown in a V-configuration.

FIG. 4 is a plan of a general procedure for designing and developing a software unit for real equipment that is to be mounted on board a vehicle in order to ensure that said real equipment does indeed operate in the vehicle, the steps of the method being shown arranged in a V-configuration and the vehicle being an aircraft.

A first design and development step of the software is constituted by study simulations Set, shown in the top portion of one of the branches of the V. During this step, prior to starting the design and development process, exploratory tests and evaluations of future man/machine interfaces are performed by preparing equipment models that nowadays are rarely re-used at a subsequent stage of the method.

The following steps relate to specifying Spe, designing Con, and producing Rea the software. At each of these steps, current techniques enable a digital mock-up of the software unit to be produced. The invention makes it possible to add thereto mock-ups that are representative of communication between software units and real equipment for which the software is mainly intended, thus making it possible, while using the same test and development tool, to develop a complete system very early in an iterative mode, including its components for managing the on-board network.

The following step is a unitary testing step Tun for verifying the software with, among others, a test of exchanging data with the remainder of the system. The purpose of these unitary tests is to verify that the processing or the management of the digital buses as performed by the equipment, where appropriate, does actually comply with design requirements. The invention enables a connection to be made with equipment that is at least partially virtual on an integration bench or directly on a vehicle, making it possible to perform unitary tests without the time required for generating and loading the on-board software constituting an obstacle during this unitary testing step Tun. The invention makes it possible to perform unitary testing in development mode, this being referred to generically as "debugging" mode, and being performed in a real environment, e.g. on an integration bench.

The following steps are on the second branch of the V going up from its base and beginning with a qualification step Qua. During this step, with the software arranged in a computer other than the computer of the real equipment for which it is intended, development and verification are performed concerning coverage of qualification tests. Under such circumstances, the at least partially virtual equipment possesses standard input/output cards representative of the real equipment. The use of widespread standard computer hardware, e.g. a PC, makes it possible to perform the qualification method step for verifying the extent to which the tests are covered, or even, in entirely simulated manner, to verify away from a test bench and at accelerated speed the extent to which the qualification tests are covered. These tests can be validated without expensive monopolization of the bench platform and it is even possible to interface a function with an integration bench even before the real equipment becomes physically available.

The following step is an integration step Int, in which the same test tool is used as on the software test bench for performing testing during the development stage. At this stage, it is also possible to develop communication with the software of the real equipment under development in a debugging mode, e.g. using a widespread standard computer hardware unit acting as an at least partially virtual computer hardware unit.

The following step is a production test step Tpr. Series test procedures are developed away from the production site on a system that is entirely simulated, said system being representative of the real equipment of the target vehicle, e.g. the target avionics if the vehicle is an aircraft.

This production test step Tpr is followed by a trial step Ess, e.g. ground or flight trials on real equipment on board an aircraft. This trial step is used for development and integration on the first carriers.

At the end of these steps of the general design and development process relating to application software for real equipment that is to be mounted on board a vehicle, once the trial step Ess has been finalized, a training simulator may be prepared in a step Sen, which step does not form properly speaking part of the above-mentioned design and development method. At this stage, the re-hosting in accordance with the invention of the real software for the equipment constituting the on-board equipment makes it possible to simulate the on-board equipment in realistic manner by using its most recent version.

After the production test method step Tpr, a client support Sup may also be generated during a step referenced Sup. The client support Sup serves to develop maintenance tools and to train client personnel prior to putting a new system into service.

When changing real equipment, in particular as a result of changing supplier or updating the software unit, it is useful to proceed using the following steps:

recovering the source codes of the applications programs of the software unit for re-hosting;

adapting the application source codes to the compiler of a standard computer hardware unit;

compiling and editing links between the application source software and the standardized hardware abstraction software layer;

testing the software unit on said computer hardware unit fitted with real standard input/output cards; and advantageously, developing the virtual-hardware software layer suitable for being fitted with virtual input/output cards to take the place of the test host computer hardware, advantageously widespread standard hardware.

The above-mentioned last step but one may either be for the purpose of arrangement when developing the software unit in a real environment, with the above-mentioned last step then being superfluous, or else a first validation step of the standardized software-hardware abstraction software layer by passing qualification tests on the arranged software unit taking the form of re-hosting.

It should be observed that in this method, the fact of using a standardized software-hardware abstraction software layer 6 with a real-hardware software layer 7 or a virtual-hardware software layer 10, as shown in FIG. 2 or 3, 3a, and 3b, means that it is not necessary to convert source code that is written in one language into another language, nor is it necessary to translate object code on another platform, nor is there is any need to create a virtual hardware platform interfacing with the hardware and software units, but rather it is necessary to create a new application architecture for re-hosting the application software on a hardware unit, advantageously using widespread standard hardware.

Thus, when updating the software unit, the interface between the layers of the present invention enables the most recent version of the on-board software unit to be recovered merely by arranging it in the form of re-hosting and, optionally, performing simulation that is representative of said latest version. It is possible, during simulation, to use the same test tool as is used for the bench in the integration step. This is achieved by replacing the real test cards by virtual cards simulated by the virtual-hardware software layer, the test tool then interfacing over the virtual buses instead of over real buses.

When changing applications or input/output cards, it is useful to proceed using the following steps:

a step of testing the virtual-hardware software layer by linking it to a test tool; and a step of compiling and editing links of said software unit with said standardized software-hardware abstraction software and said virtual-hardware software layer for execution on the at least partially virtual computer hardware unit without input/output cards.

Various options are possible: real equipment coupling or virtual equipment coupling and, optionally, real and virtual equipment coupling. As mentioned above with reference to FIG. 3a, the virtual hardware software layer 10 may advantageously be associated with a communications software layer 11 of an Ethernet network. Nevertheless, it is also possible to use any standardized communication layer regardless of whether it relies directly on a physical communications interface, e.g. an IEEE 1394 bus, otherwise known under the name "Firewire", that has been developed to provide an interconnection system enabling data to be conveyed at high speed in real time, or even that it relies on a software layer, e.g. distributed data service (DDS) software.

With reference to FIGS. 2, 3, 3a, and 3b, the use of a standardized software-hardware abstraction software layer 6 either with a virtual-hardware software layer 10 or with a real-hardware software layer 7 makes it possible to conserve the same software-hardware interfaces during all of the development steps shown in FIG. 4. Thus, the same test tool may be used for testing real buses at all of those development steps. Once a software unit has been arranged, it is possible to pass easily from use in hardware simulation mode to virtual use, and vice versa.

Figure 5:
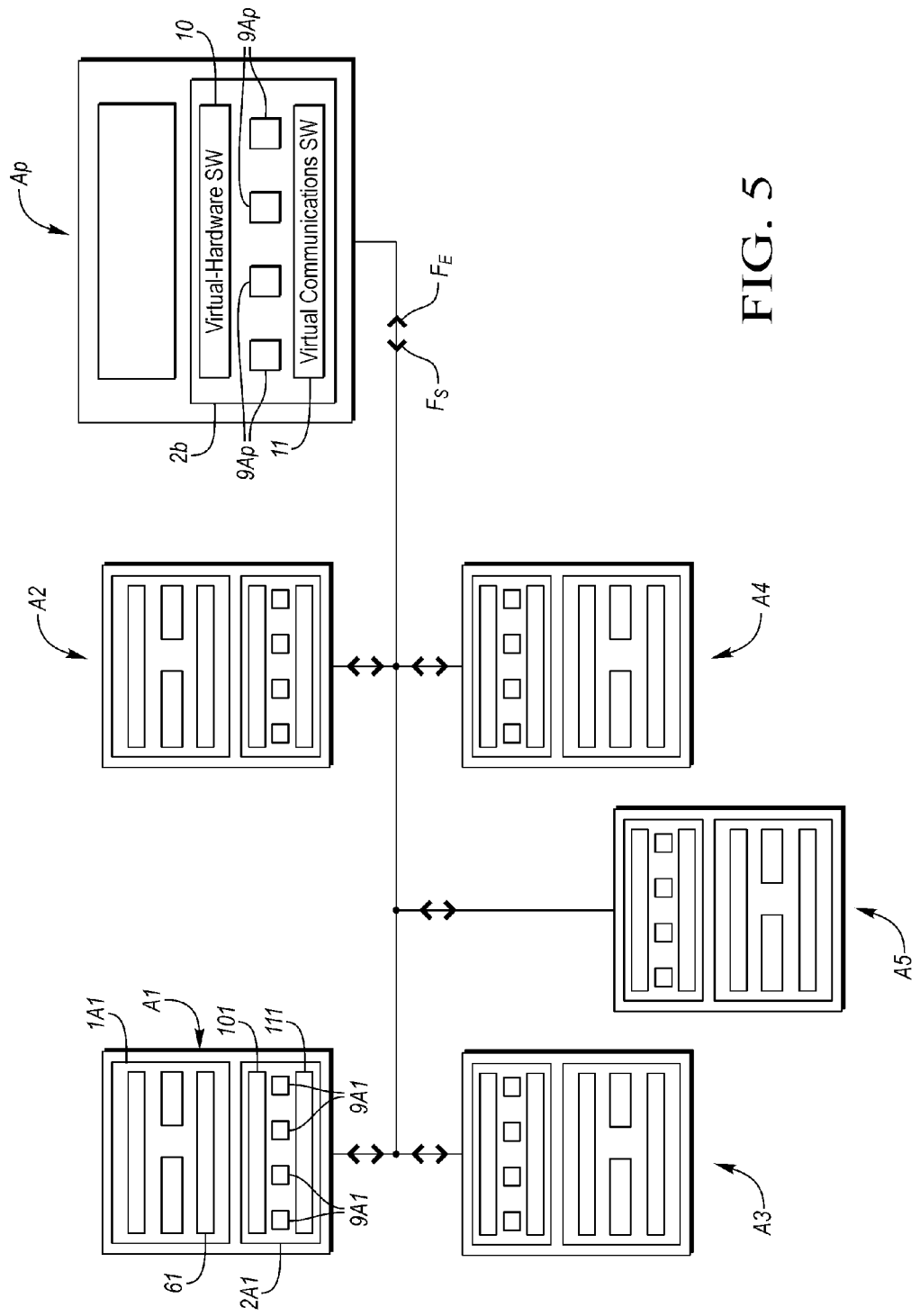
FIG. 5 is a diagram of a group of a plurality of communications control architectures of the present invention connected together to form a test tool or a simulation tool with multiple control architectures.

FIG. 5 shows a group comprising a plurality of control architectures, for real or virtual equipment. This equipment is often in the form of a simulation tool providing equipment that is at least partially virtual. It should be observed that such a group may comprise a plurality of real architectures, a plurality of virtual architectures, or a mixture of real and virtual architectures.

The group may form a test or simulation tool comprising a main communications control architecture Ap with a test or simulation software unit and a standard computer hardware unit 2b that is at least partially virtual, having a virtual-hardware software layer 10 and associated input/output cards 9Ap together with a communications layer 11, these two layers being as described above. This architecture Ap communicates via its at least partially virtual hardware unit 2b with a plurality of auxiliary architectures A1 to A5 of similar composition. This is made possible by the fact that in general, since the architectures are very similar, in particular in their use of the standardized software-hardware abstraction software layer 6, as shown in FIGS. 2 and 3, the library does not need to be completely developed once again whenever it is associated with a new unit, and it merely needs to be added to.

In FIG. 5, only the architecture A1 of the auxiliary architectures A1 to A5 is shown in detail, however this architecture A1 is representative of all of the other architectures A2 to A5. This architecture A1 comprises a software unit 1A1, a standard software-hardware abstraction software layer 61, a virtual-hardware software layer 101 in a computer hardware unit 2A1, said layer possibly also being a real-hardware software layer as shown in FIG. 2, together with its associated real and/or virtual cards 9A1. The architecture A1 includes a communications software layer referenced 111. The various architectures A1 to A5 communicate with one another via a memory exchange mechanism, e.g. LINUX, and they are connected, via at least one input/output represented by arrows FE and FS, to the at least partially virtual computer hardware unit 2b of the main architecture Ap.

It is thus possible to form real or virtual architecture groups, it being equally possible for them all to be real or all to be virtual or to comprise a combination of real architectures together with virtual architectures, e.g. to create protocol errors from the beginning of system design. This possibility of combining architectures makes it possible, for example, to operate all of the software in debugging mode on a PC while interfacing it with real equipment on a bench or on the vehicle on board which it is to be mounted. Data exchanges between computer hardware units of the architectures may advantageously take place on transmission media that are simulated and expensive, rather than in the form of functional data exchanged via shared memory.

It should be observed that the present invention is not limited to equipment on board an aircraft, and that the equipment could be on board any vehicle, in particular a motor vehicle, with the equipment then possibly being constituted by an engine controller, ABS or ARS or other types of vehicle safety equipment, or equipment forming part of the built-in systems interface (BSI), said BSI being organized around a microprocessor and controlling various pieces of electrical equipment of the vehicle.

What is claimed is:

1. An arrangement method for arranging application software designed for equipment on board an aircraft on one of a plurality of computer hardware units at a given time, wherein said plurality of computer hardware units includes a real computer hardware unit of the on-board equipment and a plurality of virtual computer hardware units of virtual equipment for an aircraft, each computer hardware unit having an operating system, source code, and a compiler, wherein the real computer hardware unit further includes at least one real input/output card, wherein each virtual computer hardware unit further includes at least one real and/or virtual input/output cards, said arrangement method comprises the following steps:

a step of arranging a first software unit having said application software and a standardized software-hardware abstraction software layer, the standardized software-hardware abstraction software layer being made up of a library of interface primitives having a common software structure and suitable for being associated with source codes of the first software unit and with the real computer hardware unit and each of the virtual computer hardware units;

a step of arranging the real computer hardware unit with a real-hardware software layer, arranging a first one of the virtual computer hardware units with a first virtual-hardware software layer, and arranging a second one of the virtual computer hardware units with a second virtual-hardware software layer, the real-hardware software layer being suitable for communicating with the standardized software-hardware abstraction software layer when the standardized software-hardware abstraction software layer is interfaced with the real-hardware software layer so that the real-hardware software layer can co-operate with the at least one real input/output card of the real computer hardware unit, the first virtual-hardware software layer being suitable for communicating with the standardized software-hardware abstraction software layer when the standardized software-hardware abstraction software layer is interfaced with the first virtual-hardware software layer so that the first virtual-hardware software layer can co-operate with the at least one real and/or virtual input/output cards of the first one of the virtual computer hardware units, and the second virtual-hardware software layer being suitable for communicating with the standardized software-hardware abstraction software layer when the standardized software-hardware abstraction software layer is interfaced with the second virtual-hardware software layer so that the second virtual-hardware software layer can co-operate with the at least one real and/or virtual input/output cards of the second one of the virtual computer hardware units;

a step of arranging the first software unit on the first one of the virtual computer hardware units, arranging a second software unit having the application software and a second standardized software-hardware abstraction software layer on the second one of the virtual computer hardware units, and arranging communications software layers of the first and second virtual computer hardware units between the first and second software units by recompiling and editing links with the library of the standardized software-hardware abstraction software layer on the first virtual computer hardware unit and a library of the second standardized software-hardware abstraction software layer on the second virtual computer hardware unit, each communications software layer including a data exchange intermediate software element constituting a software interface socket of the operating system of a corresponding virtual computer hardware unit with a communications network protocol service for communicating with other software units;

wherein the step of arranging communications software layers implements and manages data exchanges between virtual input/output cards of the first and second virtual computer hardware units; and a step of connecting disturbance software to the virtual-hardware software layer of the first virtual computer hardware unit with the first software unit arranged thereon to deliver indications of physical disturbances to be encountered on the real computer hardware unit and conveyed by the communications software layer of the first virtual computer hardware unit.

2. An arrangement method according to claim 1, wherein the method arranges hosting of a plurality of software units on real computer hardware units of real pieces of equipment.

3. An arrangement method according to claim 1, wherein the method arranges re-hosting of a plurality of software units on the virtual computer hardware units.

4. An arrangement method according to claim 1, including a step of testing a communications software layer of the first virtual computer hardware unit by coupling the first virtual computer hardware unit with the first software unit arranged thereon to at least one simulation tool acting as virtual equipment.

5. An arrangement method according to claim 1, wherein the standardized software-hardware abstraction software layer of each software unit presents the common software structure so as to be capable of being associated with the real computer hardware unit and each of the virtual computer hardware units.

6. An arrangement method according to claim 1, wherein the arrangement of the standardized software-hardware abstraction software layer of the first software unit comprises:

recovering source codes of the application software of the first software unit to be arranged on one of the computer hardware units;

adapting the source codes of said application software to a compiler of the one of the computer hardware units; and compiling and editing links for said first software unit and said standardized software-hardware abstraction software layer of said first software unit.

7. An arrangement method according to claim 1, including a step of testing the first software unit by arranging the first software unit on a virtual computer hardware unit that is coupled to a test tool acting as virtual equipment.

8. An arrangement method according to claim 1, including a step of coupling the at least one real input/output card of the real computer hardware unit with the standardized software-hardware abstraction software layer of the first software unit via the real-hardware software layer of the real computer hardware unit and including a step of coupling the at least one real and/or virtual input/output cards of a virtual computer hardware unit with the standardized software-hardware abstraction software layer of the first software unit via the virtual-hardware software layer of the virtual computer hardware unit.

9. An arrangement method according to claim 1, wherein communication between a software unit having the application software and the standardized software-hardware abstraction software layer and one of the computer hardware units on which the software unit is arranged takes place using a standardized communications protocol.

10. An arrangement method according to claim 1, wherein said virtual input/output cards form a part of the virtual equipment, wherein the virtual equipment is a simulation tool.

11. A control architecture comprising:

a first software unit arranged on one of a plurality of computer hardware units, the first software unit including application software designed for real equipment, the plurality of computer hardware units including a real computer hardware unit of the real equipment and a plurality of virtual computer hardware units of virtual equipment, each computer hardware unit having an operating system, source code, and a compiler, wherein the real computer hardware unit further includes real input/output cards for communicating with digital buses of the real computer hardware unit to operate the real equipment when the first software unit is arranged on the real computer hardware unit, wherein at least one of the plurality of virtual computer hardware units comprises a computer, wherein each virtual computer hardware unit further includes real and/or virtual input/output cards for communicating with digital buses of analog type and/or of discrete type of the virtual computer hardware unit to operate the virtual equipment when the first software unit is arranged on the virtual computer hardware unit;

wherein the first software unit further includes a standardized software-hardware abstraction software layer made up of a library of primitives that interface with source codes of the first software unit and are suitable for interfacing with the real computer hardware unit and each of the virtual computer hardware units; and wherein the real computer hardware unit further includes a real-hardware software layer, a first one of the virtual computer hardware units further includes a first virtual-hardware software layer, and a second one of the virtual computer hardware units further includes a second virtual-hardware software layer, said real-hardware software layer configured to interface with the standardized software-hardware abstraction software layer when the first software unit is arranged on the real computer hardware unit, said first virtual-hardware software layer configured to interface with the standardized software-hardware abstraction software layer when the first software unit is arranged on the first one of the virtual computer hardware units, and said second virtual-hardware software layer configured to interface with the standardized software-hardware abstraction software layer when the first software unit is arranged on the second one of the virtual computer hardware units, the real-hardware software layer serving to manage the real input/output cards of the real computer hardware unit for communicating with digital buses of the real computer hardware unit to operate the real equipment, the first virtual-hardware software layer serving to manage the real and/or virtual input/output cards of the first one of the virtual computer hardware units for communicating with digital buses of analog type and/or of discrete type of the first one of the virtual computer hardware units to operate the virtual equipment, the second virtual-hardware software layer serving to manage the real and/or virtual input/output cards of the second one of the virtual computer hardware units for communicating with digital buses of analog type and/or of discrete type of the second one of the virtual computer hardware units to operate the virtual equipment, said virtual input/output cards of the first one of the virtual computer hardware units and said virtual input/output cards of the second one of the virtual computer hardware units performing at least the same functions as the real input/output cards and associated drivers of the real computer hardware unit;

wherein the first software unit is arranged the first one of the virtual computer hardware units;

a second software unit having the application software and a second standardized software-hardware abstraction software layer, the second software unit arranged on the second one of the virtual computer hardware units;

wherein each of the first and second virtual computer hardware units includes a communications software layer, wherein the communications software layers are arranged between the first and second software units by recompiling and editing links with the library of the standardized software-hardware abstraction software layer on the first virtual computer hardware unit and a library of the second standardized software-hardware abstraction software layer on the second virtual computer hardware unit, each communications software layer including a data exchange intermediate software element constituting a software interface socket of the operating system of a corresponding virtual computer hardware unit with a communications network protocol service for communicating with other software units, wherein the arrangement of the communications software layers is such to implement and manage data exchanges between virtual input/output cards of the first and second virtual computer hardware units; and disturbance software connected to the virtual-hardware software layer of the first virtual computer hardware unit with the first software unit arranged thereon to deliver indications of physical disturbances to be encountered on the real computer hardware unit and conveyed by the communications software layer of the first virtual computer hardware unit.

12. An architecture according to claim 11, wherein the virtual equipment is a simulation tool acting as at least partially virtual equipment.

* * * * *